Oct. 29, 1940.　　　　M. OLLEY　　　　2,219,786
HYDRAULIC BRAKE
Filed June 16, 1937

Inventor
Maurice Olley
By Blackmore, Spencer & Flint
Attorneys

Patented Oct. 29, 1940

2,219,786

UNITED STATES PATENT OFFICE 2,219,786

HYDRAULIC BRAKE

Maurice Olley, Detroit, Mich., assignor to General Motors Corporation, Detroit, Mich., a corporation of Delaware Application June 16, 1937, Serial No. 148,433

5 Claims. (Cl. 188—152)

This invention relates to brakes and particularly to hydraulic brakes for use on vehicles. It is useful elsewhere but has been designed particularly for use with the hydraulic conduit leading to the front wheels and especially for use with the type of front wheel suspension in which the front end of the vehicle tends to rise when the front wheel brakes are applied.

An object of the invention is to provide such a transmission of braking force that the total brake force is always properly distributed between front and rear wheels.

A further object is to accomplish the above stated object by limiting the transmission of braking force to the front wheels to a definite amount while the front end rises.

Among other objects are the accomplishment of the major objectives by a construction which is simple and comparatively inexpensive.

Still other objects and advantages will be understood from the following specification.

In the drawing accompanying this description:

Figure 1:
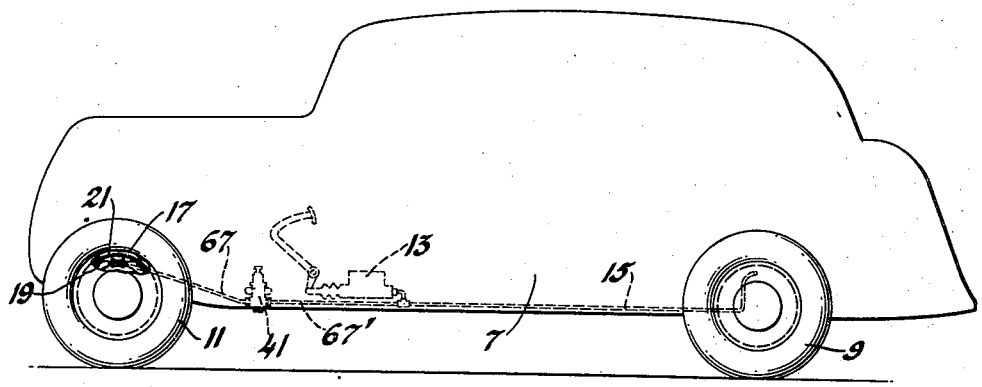
Figure 1 is a diagrammatic representation of a vehicle provided with a hydraulic brake system including the improvement constituting the subject matter of this invention.

Referring by reference characters to the drawing, numeral 7 shows a motor vehicle supported on rear wheels 9 and front wheels 11. At 13 is the master cylinder of the hydraulic brake system and 15 represents the conduits which carry the fluid medium from the master cylinder to the several wheel cylinders, one of which is shown at 17. No novelty herein is claimed for the master cylinder, for the wheel cylinders or for the shoes 19 which are to be spread into contact with the wheel drums 21.

Figure 2:
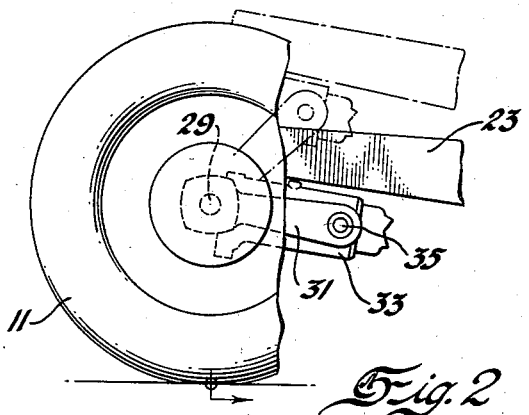
Figure 2 shows in side elevation the front end of a vehicle having a suspension for use with which this invention is more particularly useful.
Figure 3:
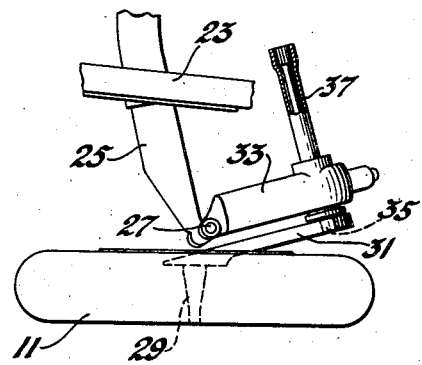
Figure 3 is a top plan view.

The invention is shown applied to a vehicle having brakes associated with both front wheels and rear wheels. Associated with each front wheel is an independent suspension of such a kind that the application of brakes to these front wheels tends to cause the overlying front end of the vehicle to rise as is shown, to an exaggerated extent by dotted lines in Figure 2. Such a suspension is shown for the reason that it is with such a suspension that this invention is particularly useful. A frame member is designated by numeral 23. A transverse member 25 is rigid therewith and carries a kingpin 27. The wheel 11 rotates on a spindle 29 carried on the front end of an arm 31 which arm is pivoted to a box 33 at 35. The box rotates in a substantially horizontal plane on the steering kingpin 27. Rotation of arm 31 is resisted by a known form of torsion spring marked 37. Within box 33 are other springs cooperating with the torsion spring. These other springs are not shown since they constitute no part of this invention. They are substantially the same as shown in my Patent No. 2,063,747, dated December 8, 1936, for Spring suspension, which patent is assigned to the assignee of this application.

Figure 4:
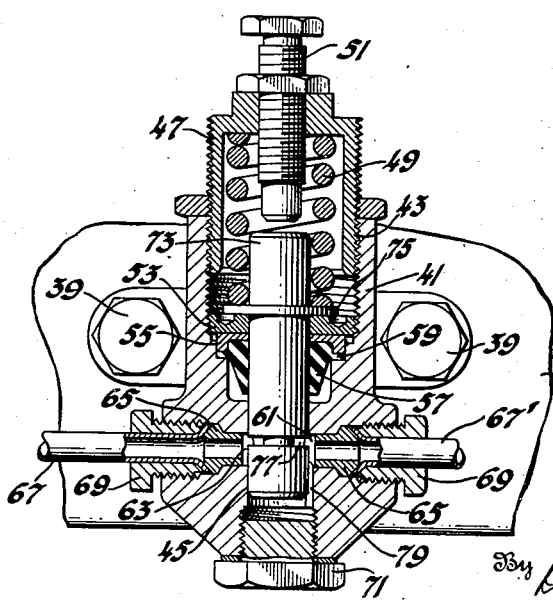
Figure 4 is a sectional view through one embodiment of my invention.

In the conduit leading to the front wheel brakes there is introduced the expedient shown by Figure 4. Secured to the frame 23 by fastening means 39 is a casing 41. This casing has a relatively large opening 43 extending down into its upper end and a communicating coaxial smaller opening 45 extending upwardly into the other end. Into the larger opening 43 is threaded a hollow cap 47 seating a spring 49, and into this cap is threaded a stop member 51, suitable lock nuts being provided as shown. In the lower end of the opening 43 is threaded a ring 53, this ring serving to hold a retainer 55 against an apertured rubber seal 57. The seal has a peripheral flange 59 clamped between a shoulder of the casing and the retainer. In the lower part of the casing and communicating with opening 45 are diametrically opposite passages 61 and 63. Within these passages are apertured cones such as 65 against which the flared ends of pipes 67 and 67' are clamped by nuts 69. These pipes are parts of the conduit 15 as will be understood by reference to the diagrammatic view Figure 1. The extreme end of the smaller opening 45 is closed by threaded plug 71. Within the openings 43 and 45 and reciprocable through the parts 53, 55 and 57 is a cylindrical valve 73. This valve has a radial flange 75 adapted to engage the ring 53 under the influence of spring 49. The valve has a peripheral groove 77 normally located within the smaller opening 45 which groove may register with passages 61 and 63. The wall of the casing adjacent the lower end of the valve is provided with an axial slot 79 whereby pressure fluid entering the casing through pipe 67' may flow to the region beneath the end of the valve. It will be seen that high pressure from pipe 67' may thus raise the valve 73 against the tension of spring 49 sufficiently to partially at least, cut off the flow between 67' and 67. In so doing, it will delay the transmission of fluid pressure to the brakes of the front wheels. The adjustment of cap 47 will determine the effectiveness of the fluid pressure in raising the valve and retarding the brake action. The downward limit of the valve is determined by the engagement of flange 75 with the ring 53. The upward limit of the valve is determined by the adjustment of threaded member 51.

In any vehicle the deceleration due to the application of the brakes to the wheels causes the mass of the supported load to tend to shift forwardly. When the front suspension is of the kind shown, the forward shifting of the supported load is associated with a rising of the front end of the supported load. This rising in itself is desirable for the comfort of the passengers, but it should not be jerky.

The acceleration of the upward movement is proportional to the brake force transmitted through the front wheels. With a brake force sufficient to stop the car in the shortest possible distance, the acceleration is not too great, but in sudden stops at low speed the brake force can—as will be explained below—momentarily rise to a much higher value and thus produce jerky hops of the front end and unsafe operation of the brakes unless a valve as described in this patent or equivalent means are used.

The jerky high peaks of brake force are produced as follows:

When the wheels are locked by braking, the brake force is limited by the available friction between road and tire, which in turn is proportional to the load carried by the tire. The load consists of three parts:

(1) The static load (weight of the car).
(2) The load caused by weight transfer from rear to front in braking.
(3) The reaction caused by the upward acceleration of the front end.

Parts (2) and (3) are proportional to the brake force, which is proportional to the total load if the wheels are locked; in this way an effect like a self-locking of the wheels to the ground is produced, with very high momentary brake force and very high upward acceleration of the car, followed in extreme cases by a lifting of the wheels off the ground and decreased brake force.

This effect can be avoided if, during the time of rising, the brake force is limited to the amount which would be available if the front end of the car did not rise. The valve described above is set so that the brake force cannot exceed this limit until a short time—during which the rise is completed—has elapsed.

As will be seen from this description, a car with a front suspension and brake valve as shown has always the same brake force available as a car which does not lift. The valve, by limiting the brake force to this maximum, prevents it from lifting jerkily in sudden stops at low speeds.

I claim:

1. In a vehicle having front wheels and rear wheels, independent suspension associated with each front wheel, said suspension being constructed and arranged so that the front end of the superposed body tends to move forwardly and upwardly when the front brakes are applied, hydraulic brake means including a master cylinder, wheel cylinders, conduits therebetween and flow retarding means responsive to pressure in the conduits leading from the master cylinder to the front brakes, said flow retarding means being operable to delay the braking action on the front wheels.

2. The invention defined by claim 1, said flow retarding means including reciprocable valve means adapted to partially close the conduit to the front brakes under the influence of the fluid pressure in the conduit, and yieldable means to resist said closing movement of the valve.

3. The invention defined by claim 1, said flow retarding means including reciprocable valve means adapted to partially close the conduit to the front brakes under the influence of the fluid pressure in the conduit, and yieldable means to resist said closing movement of the valve, together with a stop device to limit the movement of the valve in each direction of movement.

4. A flow retarding device for use within the conduit between the master cylinder of a hydraulic brake system and a front wheel cylinder, said device comprising a casing constituting a part of said conduit, a fixed seal in said casing, a valve reciprocable through said seal within said casing, spring means operable upon the upper end of said valve to depress the same to a lower limit, said valve having an annular recess to permit passage through the conduit when at its said lower limit, said casing formed to permit the flow of fluid to the region of the casing beneath the valve whereby fluid pressure tends to move the valve against the resistance of the spring means and to cut off the flow through said conduit.

5. In a vehicle having front wheels and rear wheels, hydraulic brake means including a master cylinder, a wheel cylinder for each wheel, and conduits connecting the master cylinder with the wheel cylinders and a flow retarding device in the conduit leading to the front wheel brakes only, said flow retarding device having a movable member provided with a surface exposed to said fluid whereby the member is moved in response to increasing fluid pressure to check the flow of fluid through said last named conduit, together with independent suspension means associated with each front wheel, said suspension means comprising a link extending rearwardly from the wheel spindle whereby the superposed load swings forwardly and upwardly when the wheel brakes are applied.

MAURICE OLLEY.